United States Patent [19]
Campbell et al.

[11] Patent Number: 5,507,274
[45] Date of Patent: Apr. 16, 1996

[54] CHARCOAL LIGHTER APPARATUS

[76] Inventors: Floyd W. Campbell, 832 Iron Creek Rd., Troy, Mont. 59935; Dean W. Campbell, P.O. Box 2762, Columbia Falls, Mont. 59912

[21] Appl. No.: 524,990

[22] Filed: Sep. 8, 1995

[51] Int. Cl.[6] ................................ F24B 3/00
[52] U.S. Cl. ........................ 126/25 B; 126/50
[58] Field of Search ............... 126/25 R, 25 B, 126/41 R, 50, 9 R, 39 R, 39 E; 431/344, 354, 343

[56] References Cited

U.S. PATENT DOCUMENTS

| | | | |
|---|---|---|---|
| D. 346,530 | 5/1994 | Elliott et al. | D7/416 |
| 3,033,275 | 5/1962 | Nichols | 126/25 B |
| 3,410,261 | 11/1968 | Cooper et al. | 126/25 B |
| 3,589,312 | 6/1971 | Cooper | 126/25 B |
| 3,605,653 | 9/1971 | Donnell | 126/25 B |
| 4,238,201 | 12/1980 | Spilles | 44/51 |
| 4,378,783 | 4/1983 | Hunter | 126/25 B |
| 4,503,835 | 3/1985 | Williams | 126/25 B |
| 4,531,507 | 7/1985 | Gerson | 126/25 B |

*Primary Examiner*—James C. Yeung

[57] ABSTRACT

A charcoal lighter apparatus includes a housing and a barrier assembly supported within the housing. The barrier assembly divides an internal space defined by the housing into a lower gas-bottle-storage region and an upper charcoal-briquet-storage region. The barrier assembly also divides the housing into a lower housing portion and an upper housing portion, and the barrier assembly includes a heat transfer channel which permits transfer of heat from the gas-bottle-storage region to the charcoal-briquet-storage region. A gas bottle assembly is supported by the lower housing portion and includes a bottle portion supported by the lower housing portion within the gas-bottle-storage region. The gas bottle assembly includes a manually operated gas controller connected to the bottle portion. The manually operated gas controller extends from outside the housing to the bottle portion within the gas-bottle-storage region. A handle assembly is connected to the housing and is installed on the lower housing portion of the housing. A gas ignitor assembly ignites gas from the bottle portion of the gas bottle assembly for providing a flame for providing heat to pass through the heat transfer channel to the charcoal-briquet-storage region. The handle assembly includes a pair of handle units connected to diametrically opposing positions on the housing. The lower housing portion includes a plurality of air holes arranged in the lower housing portion below the barrier assembly and above the gas bottle assembly.

6 Claims, 3 Drawing Sheets

CHARCOAL LIGHTER APPARATUS

BACKGROUND OF THE INVENTION

1. Field of the Invention

The present invention relates devices especially adapted for lighting charcoal.

2. Description of the Prior Art

Many people like to cook using a grill heated by charcoal briquets. However, before the charcoal briquets are hot enough to provide heat for cooking, the charcoal briquets themselves must be ignited. One way to ignite charcoal briquets is to use a liquid charcoal ignitor fuel. The use of a charcoal ignitor fuel has a number of disadvantages. The liquid itself may be an environmental pollutant. Moreover, if too much liquid ignitor fuel is used, the fuel may dangerously flare up and cause burns. In this respect, it would be desirable if a charcoal ignitor device could be provided which does not employ a liquid ignitor fuel.

Throughout the years, a number of innovations have been developed relating to igniting charcoal briquets without using a liquid ignitor fuel, and the following U.S. Pat. Nos. are representative of some of those innovations: 3,605,653; 4,238,201; 4,503,835; 4,531,507; and Des. 346,530. More specifically, each of U.S. Pat. Nos. 3,605,653 and Des. 346,530 discloses a charcoal ignitor device that employs a gaseous fuel for igniting the charcoal briquets. With U.S. Pat. No. 3,605,653, a long tube is placed under a pile of charcoal briquets, and a bottle of gas supplies an ignitable gas to the long tube and the pile of charcoal briquets. As the fuel from the bottle of gas burns under the charcoal briquets, the heat from the burning fuel heats the charcoal briquets. However, a person must hold and support the bottle of gas as the charcoal is being heated. This fact ties up a considerable amount of a person's time. Moreover, standing and holding the bottle of gas for an extended period of time may be tiresome and fatiguing. In this respect, it would be desirable if a charcoal ignitor device could be provided which does not require a person to hold and carry a bottle of gas as the gas is being burned for heating the charcoal briquets.

U.S. Patent No. Des. 346,530 discloses a gas fired charcoal lighter which has a plurality of tubes and jets and which appears to be required to be placed under a pile of charcoal and in direct contact with the charcoal. As such, particles of charcoal can rub against the jets and clog them. Moreover, the charcoal lighter may be left under the charcoal briquets after they are lit and used for cooking. As a result, food residues can also clog the jets of the charcoal lighter. In this respect, it would be desirable if a charcoal ignitor device could be provided which does not permit flame jets to come in direct contact the charcoal. Moreover, it would be desirable if a charcoal ignitor device could be provided which does not remain in contact with the lighted charcoal when the charcoal is employed for cooking.

U.S. Pat. No. 4,238,201 discloses a charcoal briquet lighter which employs a pasty fuel which is alcohol based. For reasons similar to not using a liquid ignitor fuel, as mentioned above, it would not be desirable to use an alcohol-based charcoal ignitor composition.

U.S. Pat. No. 4,503,835 discloses a charcoal briquet lighter that employs solid fuel, such as newspapers. It is well known that burning paper creates ashes. In addition, burning paper often creates large quantities of smoke. In this respect, it would be desirable if a charcoal ignitor device could be provided which does not create any ash and does create substantial quantities of smoke.

U.S. Pat. No. 4,531,507 discloses a charcoal lighter device which employs a portable container that contains a quantity of charcoal. The portable, charcoal-containing container is placed upon an already ignited charcoal grill. The portable container has no self-contained fuel source. Clearly, the portable container cannot be employed unless a previously ignited charcoal bed is available. In this respect, it would be desirable if a charcoal ignitor device could be provided which has a self-contained fuel source and does not require the presence of a previously lit charcoal bed.

Thus, while the foregoing body of prior art indicates it to be well known to use charcoal lighter devices, the prior art described above does not teach or suggest a charcoal lighter apparatus which has the following combination of desirable features: (1) does not employ a liquid ignitor fuel; (2) does not require a person to hold and carry a bottle of gas as the gas is being burned for heating charcoal briquets; (3) does not permit flame jets to come in direct contact the charcoal; (4) does not remain in contact with the lighted charcoal as the charcoal is employed for cooking; (5) does not create any ash from burning the ignitor fuel; (6) does not create substantial quantities of smoke from burning the ignitor fuel; (7) has a self-contained fuel source; and (8) does not require the presence of a previously lit charcoal bed. The foregoing desired characteristics are provided by the unique charcoal lighter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a charcoal lighter apparatus which includes a housing and a barrier assembly supported within the housing. The barrier assembly divides an internal space defined by the housing into a lower gas-bottle-storage region and an upper charcoal-briquet-storage region. The barrier assembly divides the housing into a lower housing portion and an upper housing portion, and the barrier assembly includes a heat transfer channel which permits transfer of heat from the gas-bottle-storage region to the charcoal-briquet-storage region. A gas bottle assembly is supported by the lower housing portion and includes a bottle portion supported by the lower housing portion within the gas-bottle-storage region. The gas bottle assembly includes a manually operated gas controller connected to the bottle portion. The manually operated gas controller extends from outside the housing to the bottle portion within the gas-bottle-storage region. A handle assembly is connected to the housing, and the handle assembly projects outward from an exterior surface of the housing. A gas ignitor assembly ignites gas from the bottle portion of the gas bottle assembly for providing a time for providing heat to pass through the heat transfer channel to the charcoal-briquet-storage region.

The manually operated gas controller includes a control shaft connected to the bottle portion and a knob is connected to the control shaft. The gas bottle assembly includes a plurality of support struts connected between the bottle portion and the lower housing portion of the housing for supporting the bottle portion within the gas-bottle-storage region.

The handle assembly is installed on the lower housing portion of the housing. The handle assembly includes a pair of handle units connected to diametrically opposing positions on the housing. The lower housing portion includes a plurality of air holes arranged in the lower housing portion below the barrier assembly and above the gas bottle assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved charcoal lighter apparatus which has all of the advantages of the prior art and none of the disadvantages.

It is another object of the present invention to provide a new and improved charcoal lighter apparatus which may be easily and efficiently manufactured and marketed.

It is a further object of the present invention to provide a new and improved charcoal lighter apparatus which is of durable and reliable construction.

An even further object of the present invention is to provide a new and improved charcoal lighter apparatus which is susceptible of a low cost of manufacture with regard to both materials and labor, and which accordingly is then susceptible of low prices of sale to the consuming public, thereby making such charcoal lighter apparatus available to the buying public.

Still yet a further object of the present invention is to provide a new and improved charcoal lighter apparatus which does not employ a liquid ignitor fuel.

Still another object of the present invention is to provide a new and improved charcoal lighter apparatus that does not require a person to hold and carry a bottle of gas as the gas is being burned for heating charcoal briquets.

Yet another object of the present invention is to provide a new and improved charcoal lighter apparatus which does not permit flame jets to come in direct contact the charcoal.

Even another object of the present invention is to provide a new and improved charcoal lighter apparatus that does not remain in contact with the lighted charcoal as the charcoal is employed for cooking.

Still a further object of the present invention is to provide a new and improved charcoal lighter apparatus which does not create any ash from burning the ignitor fuel.

Yet another object of the present invention is to provide a new and improved charcoal lighter apparatus that does not create substantial quantities of smoke from burning the ignitor fuel.

Still another object of the present invention is to provide a new and improved charcoal lighter apparatus which has a self-contained fuel source.

Yet another object of the present invention is to provide a new and improved charcoal lighter apparatus that does not require the presence of a previously lit charcoal bed.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
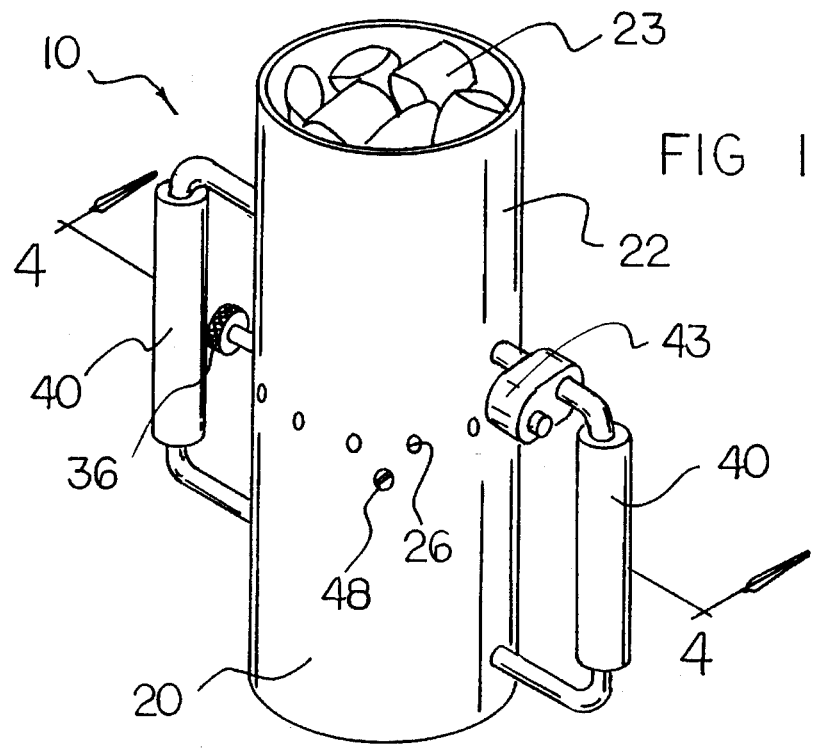
FIG. 1 is a perspective view showing a preferred embodiment of the charcoal lighter apparatus of the invention in use heating a quantity of charcoal briquets.

With reference to the drawings, a new and improved charcoal lighter apparatus embodying the principles and concepts of the present invention will be described.

Turning to FIGS. 1–5, there is shown an exemplary embodiment of the charcoal lighter apparatus of the invention generally designated by reference numeral 10. In its preferred form, charcoal lighter apparatus 10 includes a housing 12 and a barrier assembly 14 supported within the housing 12. The barrier assembly 14 divides an internal space defined by the housing 12 into a lower gas-bottle-storage region 16 and an upper charcoal-briquet-storage region 18. The barrier assembly 14 divides the housing 12 into a lower housing portion 20 and an upper housing portion 22, and the barrier assembly 14 includes a heat transfer channel 28 which permits transfer of heat from the gas-bottle-storage region 16 to the charcoal-briquet-storage region 18. A gas bottle assembly is supported by the lower housing portion 20 and includes a bottle portion 30 supported by the lower housing portion 20 within the gas-bottle-storage region 16. The gas bottle assembly includes a manually operated gas controller 32 connected to the bottle portion 30. The manually operated gas controller 32 extends from outside the housing 12 to the bottle portion 30 within the gas-bottle-storage region 16. A handle assembly is connected to the housing 12, and the handle assembly projects outward from an exterior surface of the housing 12. A gas ignitor assembly 42 ignites gas from the bottle portion 30 of the gas bottle assembly for providing a flame 44 for providing heat to pass through the heat transfer channel 28 to the charcoal-briquet-storage region 18.

The gas ignitor assembly 42 includes a manually operable ignitor portion 43 which is supported by one of the handle units 40. The gas ignitor assembly 42 also includes an interior portion 45 which extends from the manually operable ignitor portion 43 to the heat transfer channel 28. If desired, the gas ignitor assembly 42 can be supported by the housing 12 and extend inside the housing 12 to light a flame 44 without being supported by one of the handle units 40. The manually operated gas controller 32 includes a control shaft 34 connected to the bottle portion 30 and a knob 36 is connected to the control shaft 34.

The gas bottle assembly includes a plurality of support struts 46 connected between the bottle portion 30 and the lower housing portion 20 of the housing 12 for supporting the bottle portion 30 within the gas-bottle-storage region 16. Each support strut 46 is connected to the lower housing portion 20 of the housing 12 by a screw 48.

The handle assembly is installed on the lower housing portion 20 of the housing 12. Because the handle assembly is installed on the lower housing portion 20 of the housing 12, a relatively small amount of heat from the flame 44 will be transmitted to the handle assembly. Therefore, the handle assembly will remain relatively cool and not too hot to grasp. The handle assembly includes a pair of handle units 40 connected to diametrically opposing positions on the housing 12.

The lower housing portion 20 includes a plurality of air holes 26 arranged in the lower housing portion 20 below the barrier assembly 14 and above the gas bottle assembly. The air holes 26 provide additional air to support combustion of the gas exiting from the bottle portion 30 to provide the flame 44.

In using the charcoal lighter apparatus 10 of the invention, a quantity of room temperature charcoal briquets 23 is loaded into the charcoal-briquet-storage region 18 of the housing 12. The charcoal briquets 23 are retained in the charcoal briquets 23 by the barrier assembly 14 located adjacent to the charcoal-briquet-storage region 18 of the housing 12. Then, the knob 36 of the manually operated gas controller 32 is rotated, whereby a flow of gas exits from the bottle portion 30 of the gas bottle assembly. The gas can be propane gas stored in a bottle portion 30 which contains propane gas. The manually operable ignitor portion 43 of the gas ignitor assembly 42 is operated so that the gas exiting from the bottle portion 30 is ignited to form a flame 44. More specifically, the manually operable ignitor portion 43 can operate a conventional flint ignitor that is located in the interior portion 45 of the gas ignitor assembly 42.

Figure 2:
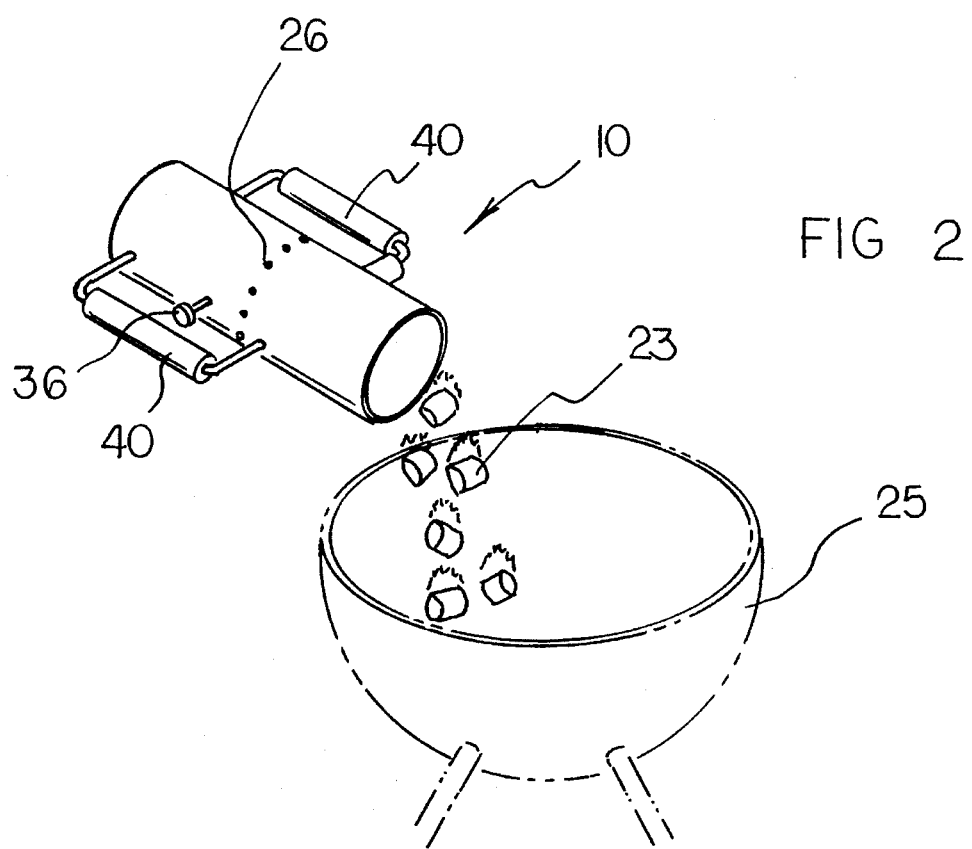
FIG. 2 is a perspective view of the embodiment of the charcoal lighter apparatus shown in FIG. 1 being tilted to dump the heated charcoal briquets into the body of a charcoal grill.
Figure 3:
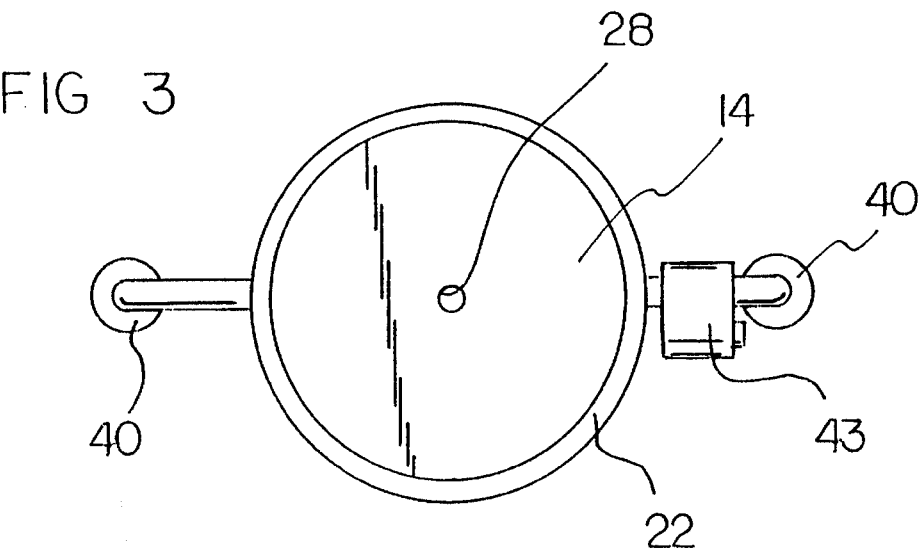
FIG. 3 is a top view of the embodiment of the charcoal lighter apparatus of FIG. 2 with the charcoal briquets removed from the apparatus.
Figure 4:
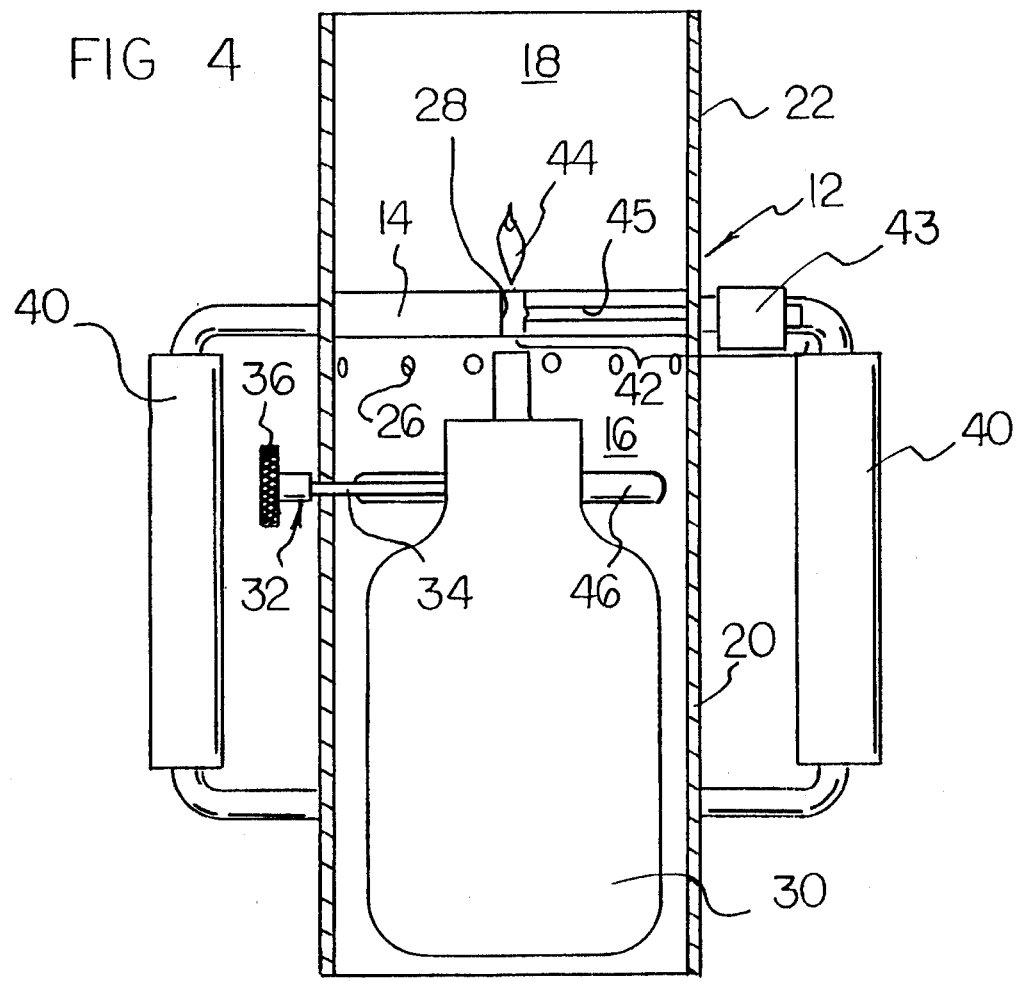
FIG. 4 is a perspective view of the embodiment of the invention shown in FIG. 1 taken along line 4—4 with the charcoal briquets removed.
Figure 5:
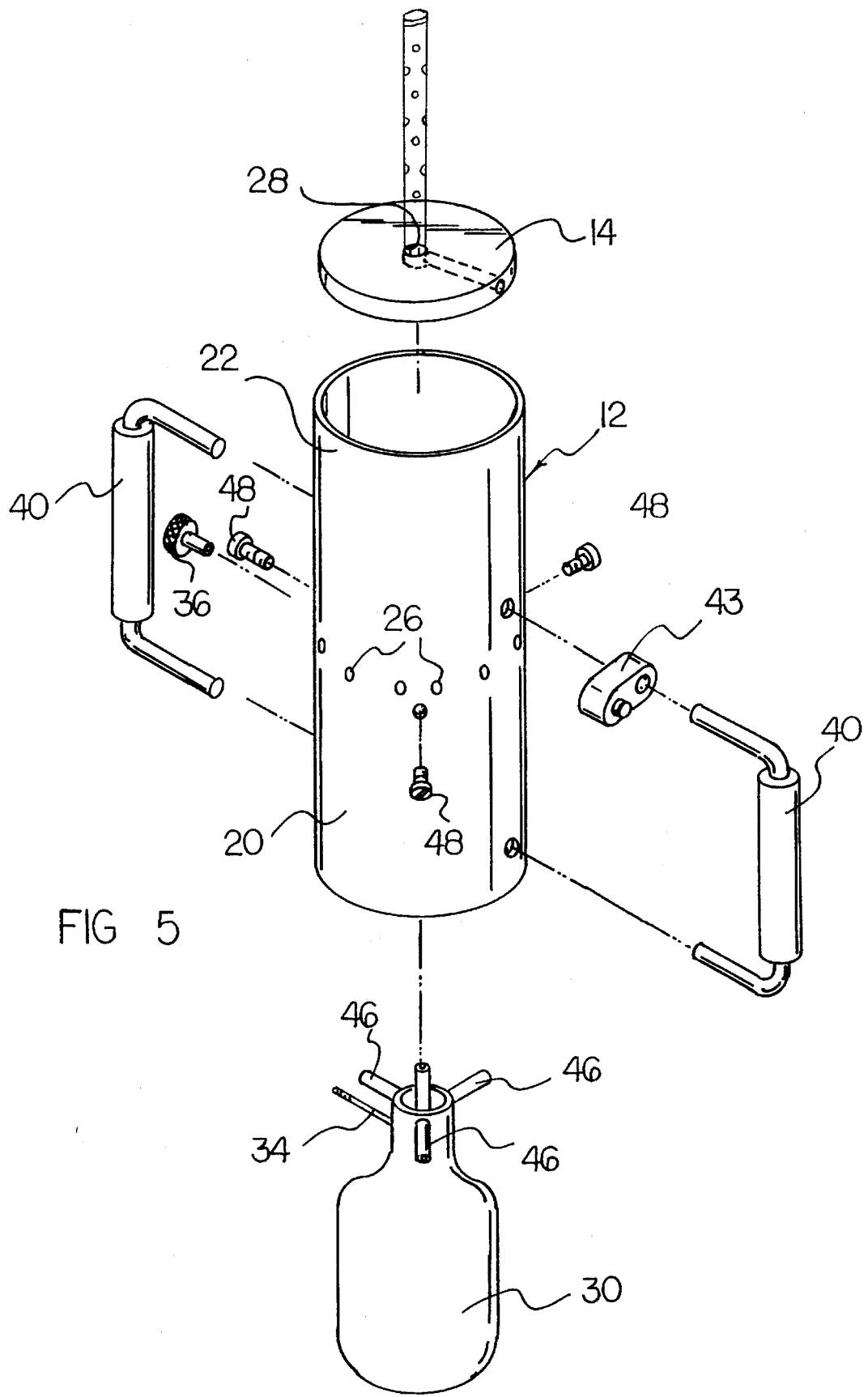
FIG. 5 is an exploded view of the embodiment of the invention shown in FIG. 4.

As the flame 44 burns, heat from the flame 44 is communicated through the heat transfer channel 28 to the charcoal briquets 23 in the charcoal-briquet-storage region 18. Once the charcoal briquets 23 are sufficiently ignited, the gas flow is turned off. The handle units 40 are grasped and the charcoal lighter apparatus 10 is carried to a charcoal grill 25 as shown in FIG. 2. The ignited charcoal briquets 23 are dumped out of the charcoal-briquet-storage region 18 by lowering the charcoal-briquet-storage region 18 of the housing 12 with respect to the gas-bottle-storage region 16.

It is noted that the barrier assembly 14 prevents charcoal briquets 23 and dust from clogging the exit jet of the bottle portion 30 of the gas bottle assembly.

The components of the charcoal lighter apparatus of the invention can be made from inexpensive and durable metal and heat-resistant plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved charcoal lighter apparatus that is low in cost, relatively simple in design and operation, and which may advantageously be used without employing a liquid ignitor fuel. With the invention, a charcoal lighter apparatus is provided which does not require a person to hold and earn/a bottle of gas as the gas is being burned for heating charcoal briquets. With the invention, a charcoal lighter apparatus is provided which does not permit flame jets to come in direct contact the charcoal. With the invention, a charcoal lighter apparatus is provided which does not remain in contact with the lighted charcoal as the charcoal is employed for cooking. With the invention, a charcoal lighter apparatus is provided which does not create any ash from burning the ignitor fuel. With the invention, a charcoal lighter apparatus is provided which does not create substantial quantities of smoke from burning the ignitor fuel. With the invention, a charcoal lighter apparatus is provided which has a self-contained fuel source. With the invention, a charcoal lighter apparatus is provided which does not require the presence of a previously lit charcoal bed.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A charcoal lighter apparatus, comprising:

a housing, a barrier assembly supported within said housing, wherein said barrier assembly divides an internal space defined by said housing into a lower gas-bottle-storage region and an upper charcoal-briquet-storage region, wherein said barrier assembly divides said housing into a lower housing portion and an upper housing portion, and wherein said barrier assembly includes a heat transfer channel which permits transfer of heat from said gas-bottle-storage region to said charcoal-briquet-storage region, a gas bottle assembly supported by said lower housing portion, wherein said gas bottle assembly includes a bottle portion supported by said lower housing portion within said gas-bottle-storage region and includes a manually operated gas controller connected to said bottle portion, wherein said manually operated gas controller extends from outside said housing to said bottle portion within said gas-bottle-storage region, a handle assembly connected to said housing, wherein said handle assembly projects outward from an exterior surface of said housing, and a gas ignitor assembly for igniting gas from said bottle portion of said gas bottle assembly for providing a flame for providing heat to pass through said heat transfer channel to said charcoal-briquet-storage region.

2. The apparatus of claim 1 wherein said manually operated gas controller includes a control shaft connected to said bottle portion and a knob connected to said control shaft.

3. The apparatus of claim 1 wherein said gas bottle assembly includes a plurality of support struts connected between said bottle portion and said lower housing portion of said housing for supporting said bottle portion within said gas-bottle-storage region.

4. The apparatus of claim 1 wherein said handle assembly is installed on said lower housing portion of said housing.

5. The apparatus of claim 4 wherein said handle assembly includes a pair of handle units connected to diametrically opposing positions on said housing.

6. The apparatus of claim 1 wherein said lower housing portion includes a plurality of air holes arranged in said lower housing portion below said barrier assembly and above said gas bottle assembly.

\* \* \* \* \*